US008442857B1

(12) United States Patent
Ramani et al.

(10) Patent No.: US 8,442,857 B1
(45) Date of Patent: May 14, 2013

(54) PULP AND PAPER HIGH PERFORMANCE CAPABILITY ASSESSMENT

(75) Inventors: Senthil Ramani, Bangalore (IN); Subhashish Ray, Mumbai (IN)

(73) Assignee: Accenture Global Services Limited, Dublin (IE)

( * ) Notice: Subject to any disclaimer, the term of this patent is extended or adjusted under 35 U.S.C. 154(b) by 418 days.

(21) Appl. No.: 12/713,597

(22) Filed: Feb. 26, 2010

Related U.S. Application Data

(60) Provisional application No. 61/164,618, filed on Mar. 30, 2009.

(51) Int. Cl.
*G06Q 10/00* (2012.01)
*G06Q 30/00* (2012.01)

(52) U.S. Cl.
USPC .................. 705/7.38; 705/7.39; 705/7.29

(58) Field of Classification Search ............... 705/7.29, 705/7.38, 7.39
See application file for complete search history.

(56) References Cited

U.S. PATENT DOCUMENTS

| | | | | |
|---|---|---|---|---|
| 5,630,148 | A * | 5/1997 | Norris ........................... | 713/322 |
| 5,774,121 | A * | 6/1998 | Stiegler ........................ | 715/769 |
| 6,256,773 | B1 | 7/2001 | Bowman-Amuah | |
| 6,324,647 | B1 | 11/2001 | Bowman-Amuah | |
| 6,370,573 | B1 | 4/2002 | Bowman-Amuah | |
| 6,601,233 | B1 | 7/2003 | Underwood | |
| 6,889,096 | B2 * | 5/2005 | Spriggs et al. .................. | 700/17 |
| 6,957,186 | B1 | 10/2005 | Guheen et al. | |
| 2002/0035495 | A1 | 3/2002 | Spira et al. | |
| 2003/0023468 | A1 * | 1/2003 | Aurrichio et al. ................. | 705/7 |
| 2003/0083912 | A1 * | 5/2003 | Covington et al. ............... | 705/7 |
| 2003/0110067 | A1 | 6/2003 | Miller et al. | |
| 2004/0098299 | A1 | 5/2004 | Ligon et al. | |
| 2004/0243462 | A1 * | 12/2004 | Stier ............................... | 705/11 |
| 2006/0253310 | A1 * | 11/2006 | Fuchs et al. ...................... | 705/8 |
| 2008/0027790 | A1 * | 1/2008 | Balz et al. ....................... | 705/11 |
| 2010/0082380 | A1 * | 4/2010 | Merrifield et al. ................ | 705/7 |
| 2011/0119161 | A1 * | 5/2011 | Van Treeck .................. | 705/27.2 |

OTHER PUBLICATIONS

Brochure, "High Performance Acceleration: Global Retail Process Model," Accenture, High Performance Delivered, 2007.
Handbook, Software Engineering Institute, "A Description of the Systems Engineering Capability Maturity Model Appraisal Method Version 1.1," Mar. 1996.
Keith A. Heston, "Achieving Delivery Excellence Using the Capability Maturity Model Integration," *Accenture, High Performance Delivered*, 2006.
Report, Software Engineering Institute, "A Systems Engineering Capability Maturity Model, Version 1.1.," Nov. 1995.

(Continued)

*Primary Examiner* — Jonathan G Sterrett
*Assistant Examiner* — Folashade Anderson
(74) *Attorney, Agent, or Firm* — Brinks Hofer Gilson & Lione

(57) ABSTRACT

A high performance capability assessment model helps a pulp and paper business meet the challenges of the global marketplace. As a result, the pulp and paper business can achieve the clarity, consistency, and well-defined execution of core processes that reduce inefficiencies and waste that result from unnecessary process complexity and exceptions. In addition, the high performance capability assessment model helps the pulp and paper industry business to identify specific areas in which improvements may be made and understand how to make the improvements, and establishes levels of capability along the way to reaching an ultimate capability goal.

15 Claims, 16 Drawing Sheets

OTHER PUBLICATIONS

Walker Royce, "CMM vs. CMMI: From Conventional to Modern Software Management," *The Rational Edge*, 2002.
Non-Final Office Action dated Apr. 28, 2011, issued in related U.S. Appl. No. 12/129,080.
U.S. Appl. No. 11/823,112, filed Jun. 25, 2007.
U.S. Appl. No. 12/124,010, filed May 20, 2008.
U.S. Appl. No. 12/129,080, filed May 29, 2008.
U.S. Appl. No. 61/086,927, filed Aug. 7, 2008.
U.S. Appl. No. 12/194,793, filed Aug. 20, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/427,201, filed Apr. 21, 2009.
U.S. Appl. No. 12/471,767, filed May 26, 2009.
U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,900, filed Feb. 23, 2010.
U.S. Appl. No. 12/710,662, filed Feb. 23, 2010.
U.S. Appl. No. 12/713,647, filed Feb. 26, 2010.

* cited by examiner

PULP AND PAPER HIGH PERFORMANCE CAPABILITY ASSESSMENT

CROSS-REFERENCE TO RELATED APPLICATIONS

This application claims the benefit of priority from Provisional Application Ser. No. 61/164,618, entitled Pulp and Paper High Performance Capability Assessment, filed Mar. 30, 2009, and which is hereby incorporated by reference in its entirety.

BACKGROUND OF THE INVENTION

1. Technical Field

This disclosure concerns a system and method to identify the performance of an organization on a scale of mastery across representative capabilities of the organization's industry. In particular, this disclosure relates to an efficient and cost effective way to assess the performance level of key capability areas within the processes of a pulp and paper industry organization.

2. Background Information

Modern pulp and paper industry organizations operate in an increasingly challenging environment. To survive, pulp and paper industry organizations must adapt to this environment and execute in a clear, consistent, and efficient manner. Furthermore, the regularity requirements and resource management challenges of pulp and paper businesses greatly increase the complexity and difficulty of surviving on a day-to-day basis.

Despite the need for a pulp and paper organization to meet the challenges of the global marketplace, it is still often the case that the business lacks clarity, consistency, and well-defined execution of its core processes. These shortcomings severely constrain the business, and lead directly to inefficiencies and waste due to unnecessary complexity, process exceptions, and customer dissatisfaction. At the same time, it can be very difficult to identify specific processes to which improvements may be made, either because the business itself does not have the expertise to identify the processes or because the complexities of the business frustrate attempts to clearly delineate the processes to be improved.

Even if the pulp and paper business, on its own, could identify one of the many processes that it needs to improve, the business would not necessarily know how to improve the process or be able to identify a concrete and measurable improvement goal. Another difficulty exists in determining whether there are any intermediate goals that should be reached along the way. As pulp and paper businesses struggle to meet the demands of the modern economic landscape, they fail to identify opportunities for maximizing compliance and margin improvement, category expansion, multi-channel execution, selling performance, customer satisfaction improvement, and to reach other important goals.

Therefore, a need exists for an efficient and effective system and method to assess the performance level of key assessment areas within the processes of an organization.

SUMMARY

A high performance capability assessment (HPCA) model helps pulp and paper businesses meet the challenges of the global marketplace by defining a scale of performance mastery along which the current practices of the business may be located. The HPCA model accelerates the discovery of process and performance gaps within business operations. In addition, the HPCA model also helps the business to identify specific areas in which improvements may be made, how to make the improvements, and how to establish performance measures during the course of attempting to achieve an ultimate goal. As a result, the business can achieve the clarity, consistency, and well-defined execution of core processes that maximize the operating budget for optimum outcomes.

The HPCA model includes a key factor dimension and a performance mastery scale dimension. The performance mastery scale dimension defines multiple mastery levels. The performance mastery levels form a scale of increasing organizational performance. The scale includes a 'Basic' mastery level, an 'Intermediate' mastery level, and an 'Advanced' mastery level. Each performance mastery level includes criteria specific to a corresponding key assessment area. Each key assessment area identifies some aspect of a capability of a business.

A business capability can be defined as a bundle of closely integrated skills, knowledge, technologies, and cumulative learning that is exercised through a set of processes and that collectively represents an organization's ability to create value by producing outcomes and results. Capability area does not represent a delineation of organizational responsibilities as the business outcomes of a capability may be the result of a number of cross-functional teams. Capabilities of a business may be grouped into platforms. For example, the HPCA model groups the capabilities of the pulp and paper industry into ten high-level platforms, including a pulp fiber platform, a manage fiber supply platform, a produce rolls platform, a maintain production capability platform, a source and supply goods and services platform, a plan and manage supply chain network and inventory platform, a perform sales and operations planning platform, a provide production capability and operating services platform, a finish products platform, and a market and sell products platform. Examples of capabilities within the pulp fiber platform, for example, include prepare fiber, pulp and bleach, and dry and bale. Platforms may include sub-platforms, as well as capabilities.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. For example, the manage fiber supply platform includes develop site, manage forest operation, and transport logs key assessment areas at each of the capability levels along the performance capability scale dimension. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

Other systems, methods, features, and advantages will be, or will become, apparent to one with skill in the art upon examination of the following figures and detailed description. All such additional systems, methods, features, and advantages are included within this description, are within the scope of the invention, and are protected by the following claims.

BRIEF DESCRIPTION OF THE DRAWINGS

The pulp and paper industry high performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

DETAILED DESCRIPTION OF THE PREFERRED EMBODIMENTS

Figure 1:
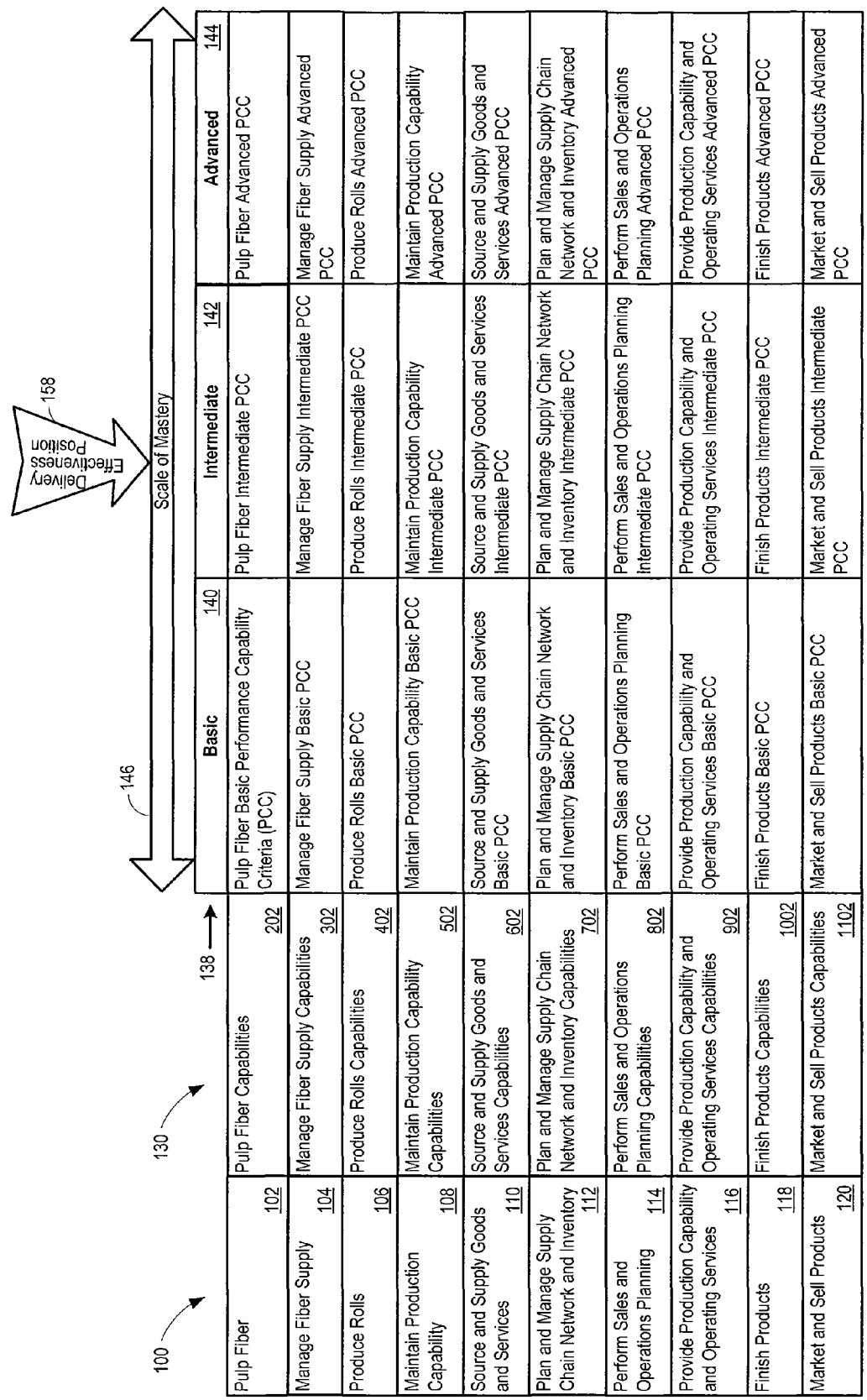
FIG. 1 shows a high performance capability assessment model with a performance scale of mastery and performance criteria shown for different capabilities.

FIG. 1 shows a high performance capability assessment (HPCA) model 100. The HPCA model 100 specifies ten high-level platforms, including a pulp fiber platform 102, a manage fiber supply platform 104, a produce rolls platform 106, a maintain production capability platform 108, a source and supply goods and services platform 110, a plan and manage supply chain network and inventory platform 112, a perform sales and operations planning platform 114, a provide production capability and operating services platform 116, a finish products platform 118, and a market and sell products platform 120. The HPCA model 100 is not limited to the form shown in FIG. 1. Instead, the HPCA model 100 may be adapted and modified to fill a wide variety of analysis roles. Additional, different, or fewer platforms may be used in other implementations, with each platform defining additional, different, or fewer capabilities. Each platform includes one or more multiple <platform name> capabilities 130.

The HPCA model 100 establishes a multidimensional pulp and paper industry performance reference set that includes multiple key assessment performance levels 138, further described below in reference Tables 1-3. The performance levels 138 establish a scale of increasing effectiveness in delivery of each capability. The key assessment performance reference tables include a 'Basic' 140 delivery level, an 'Intermediate' 142 delivery level and an 'Advanced' 144 delivery level. The performance levels establish a scale of mastery 146 along which current business practices may be located and identified with respect to any platform and capability within a platform according to an analysis of performance capability criteria (PCC). The capability under evaluation may be assigned the performance level 138 based on a delivery effectiveness position 158 along the scale of mastery 146.

The 'Basic' delivery level 140 specifies 'Basic' performance assessment criteria, the 'Intermediate' delivery level 142 specifies 'Intermediate' performance assessment criteria, and the 'Advanced' delivery level 144 specifies 'Advanced' performance assessment criteria. The HPCA model 100 receives input data that specifies a pulp and paper business platform (e.g., a pulp and paper industry area) and a pulp and paper industry key assessment area for analysis. The HPCA model 100 searches the multidimensional pulp and paper industry performance reference set for a matching key assessment performance reference table that matches the pulp and paper industry platform and corresponding industry capability within the platform and the pulp and paper industry key assessment area, and retrieves the matching key assessment performance reference table. The HPCA model 100 initiates analysis of the matching key assessment performance reference table to obtain a resultant performance assessment level for the pulp and paper industry key assessment area.

Tables 1-3 below provide an explanation of each of the capability levels 140, 142, and 144.

TABLE 1

'Basic' Delivery Level

| | |
|---|---|
| Description: | Capability mastery at a basic level is indicative of a high level, unclear, undisciplined, or unsophisticated ability to execute the capability in a consistent, traceable, and repeatable manner in alignment with the organizational goals and objectives. For non-core, low priority, new, or early adoption of certain process capabilities, a basic level may be acceptable to the organization or the organization may not have the resources to expand beyond the basic capability level. At this level of mastery, the organization is mostly unaware of how to measure the performance of the capability, or which part of the organization should be entrusted with oversight and execution of the capability, and further may not be enabled by IT. Thus, a basic level of mastery often indicates that an organization is lagging behind its competitors in its ability to execute the capability. |

TABLE 2

'Intermediate' Delivery Level

| | |
|---|---|
| Description: | Capability mastery at an intermediate level is indicative of a conservative ability to execute the capability in a fairly consistent, traceable, and repeatable manner with proven techniques, tools and commonly accepted practices that are readily available and maintained. This capability mastery is either a strategic decision by the organization to be a follower or "good enough" operator in many respects or is an interim step that organizations aspire to move |

TABLE 2-continued

'Intermediate' Delivery Level beyond and achieve a market leading mastery of the given capability. At this level of maturity the organization has mechanisms to measure the performance of the capability with clear execution responsibilities within the organization but with mostly unclear oversight which often leads to alignment issues. An intermediate level of mastery often indicates that an organization is performing consistently with its competitors in its ability to execute a capability.

TABLE 3

'Advanced' Delivery Level

Description: Capability mastery at an advanced is indicative of a highly detailed, clear, and often iterative and sophisticated ability to execute the capability. The advanced practice is the recognized and referenced benchmark of continuous improvement and high performance for a given process capability. At this maturity level the process capability has been optimized for efficiency and effectiveness, is well understood, traceable, and consistently executed to the point of being competitively differentiated or at the top level of peer-to-peer comparison. It is measurable and aligned with the overall organization goals and objectives and is mostly enabled by IT.

For FIGS. 2-11, the capability under evaluation may be assigned a level of mastery 138 based on the business' position along the scale of mastery 146 (e.g., the 'basic,' 'intermediate,' or 'advanced' delivery level). Performance criteria corresponding to the basic 140, intermediate 142 and advanced 144 performance levels populate the HPCA model 100. The performance criteria capture characteristics, and/or other features of the delivery of a capability at a particular performance level. Examples below illustrate performance criteria that provide analysis and benchmarking for pulp and paper industry organizations. The HPCA model 100 performance criteria provide a tool for determining where a platform and capability under examination falls along the scale of mastery 146.

For example, business consultants and business process engineers may interview a business or receive data about the business to determine, measure, or otherwise ascertain the characteristics, criteria, and other features of a particular capability implemented within the business. The consultants and engineers may compare the characteristics of the business to the performance criteria in the HPCA model 100 and arrive at an assessment level 138 for the capability under examination. In doing so, for example, the consultants and engineers may identify where the capability under examination falls in terms of the performance level for each key assessment area of a capability and determine an overall position on the scale of mastery 146 for the capability under examination. Performance criteria may populate the HPCA model 100 in whole or in part. Multiple high performance capability assessments may be collected and stored with the performance criteria for future retrieval and possible modification in a capability detail pool, discussed below.

Figure 2:
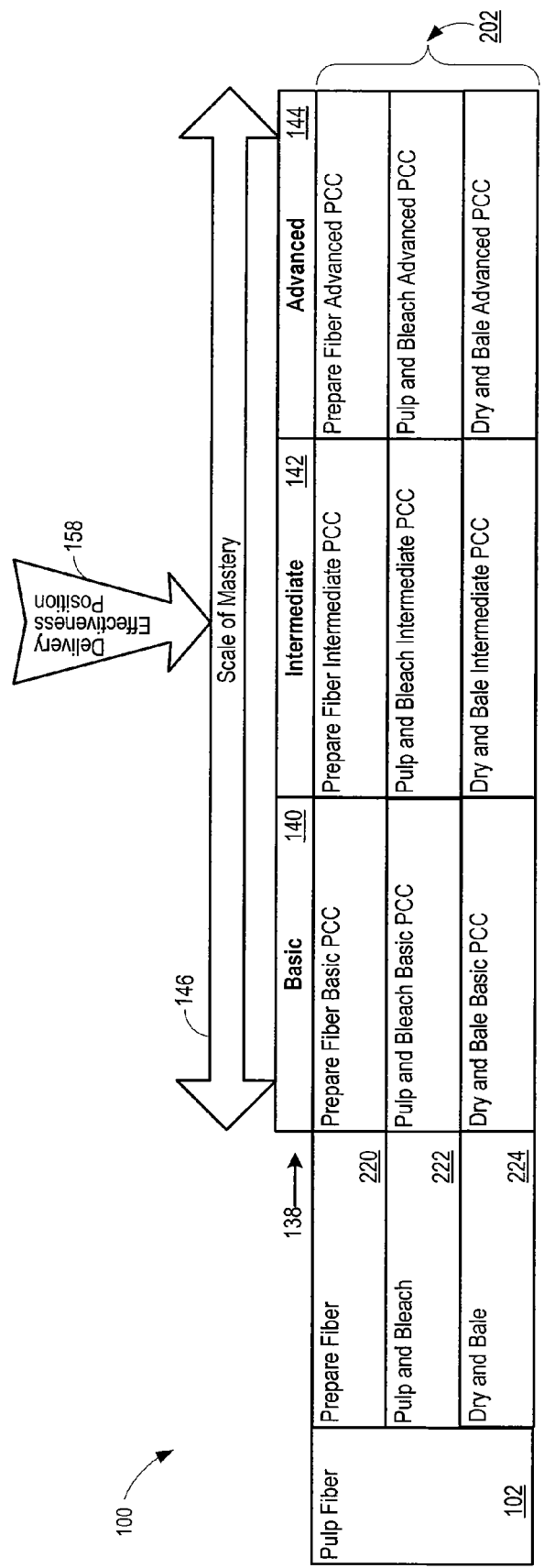
FIG. 2 shows a high performance capability assessment model with pulp fiber capabilities shown.

FIG. 2 shows the pulp fiber platform 102 divided into respective capability areas 202. The pulp fiber platform 102 includes a prepare fiber capability 220, a pulp and bleach capability 222, and a dry and bale capability 224.

Figure 3:
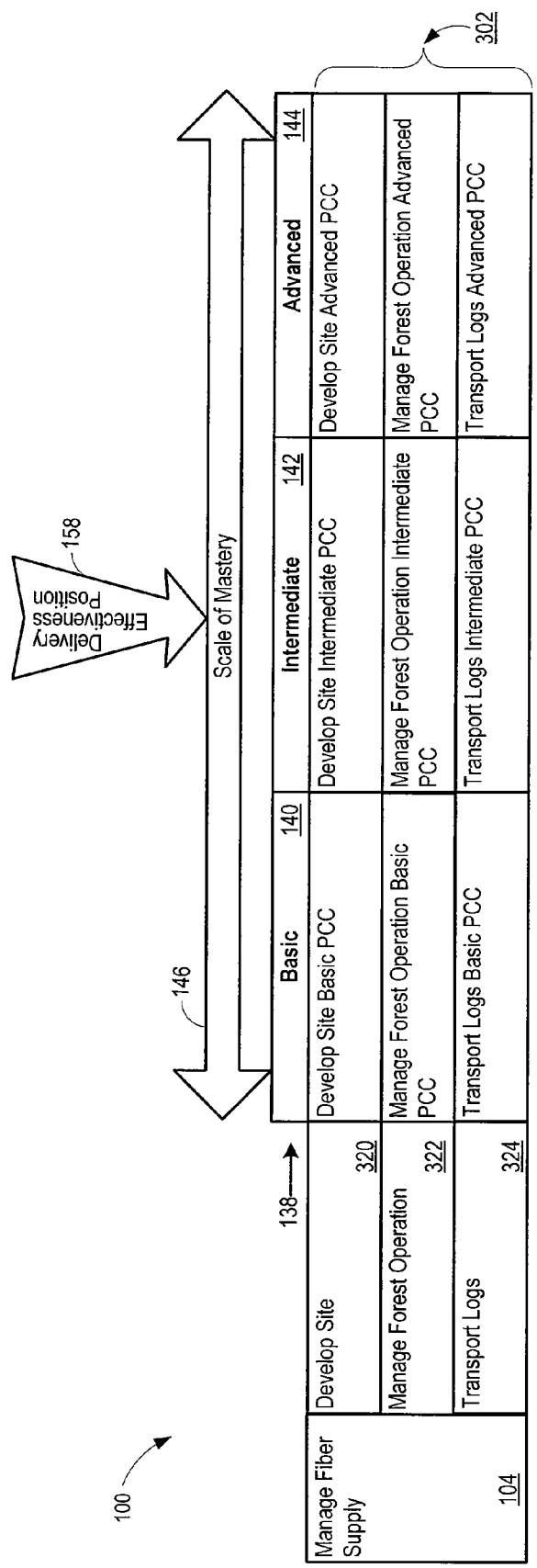
FIG. 3 shows a high performance capability assessment model with manage fiber supply capabilities shown.

FIG. 3 shows the manage fiber and supply platform 104 divided into respective capability areas 302. The manage fiber supply platform 104 includes a develop site capability 320, a manage forest operation capability 322, and a transport logs capability 324.

Figure 4:
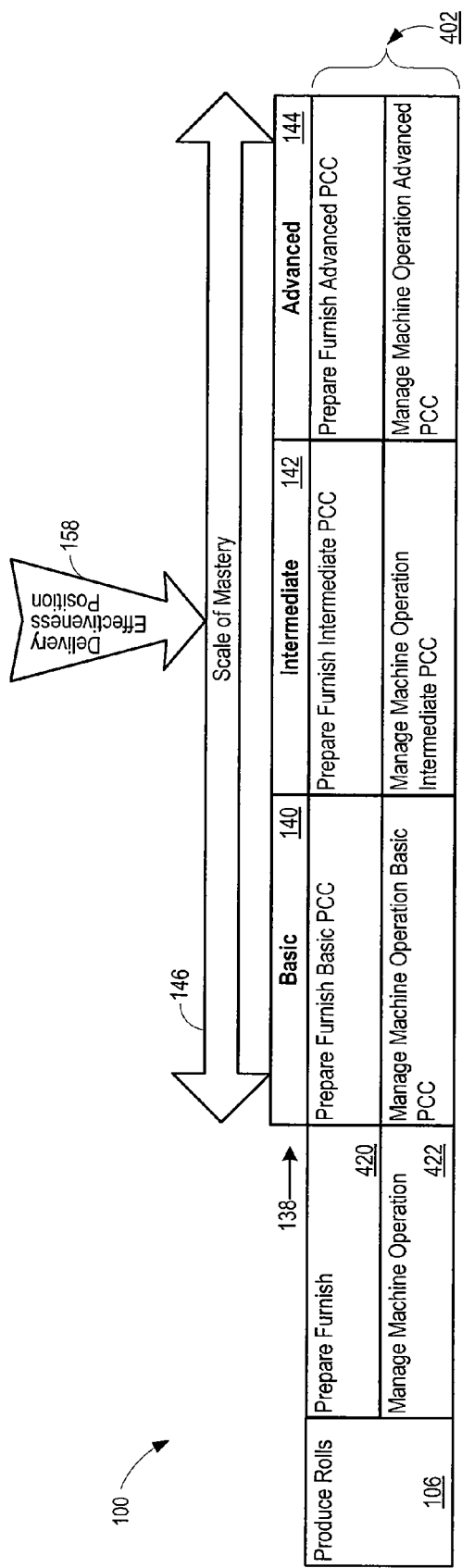
FIG. 4 shows a high performance capability assessment model with produce rolls capabilities shown.

FIG. 4 shows the produce rolls platform 106 divided into respective capability areas 402. The produce rolls platform 106 includes a prepare furnish capability 420, and a manage machine operation capability 422.

Figure 5:
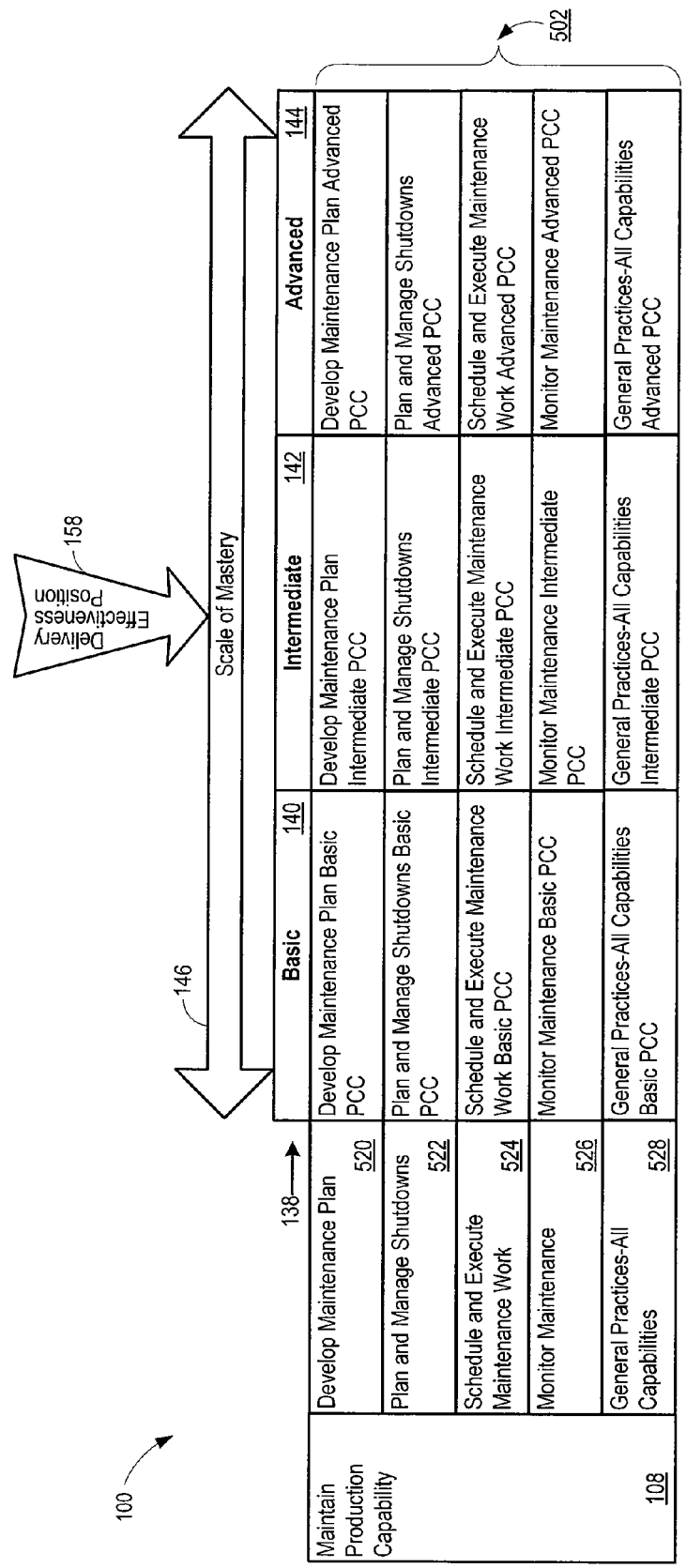
FIG. 5 shows a high performance capability assessment model with maintain production capability capabilities shown.

FIG. 5 shows the maintain production capability platform 108 divided into respective capability areas 502. The maintain production capability platform 108 includes a develop maintenance plan capability 520, a plan and manage shutdowns capability 522, a schedule and execute maintenance work capability 524, a monitor maintenance capability 526, and a general practices-all capabilities capability 528.

Figure 6:
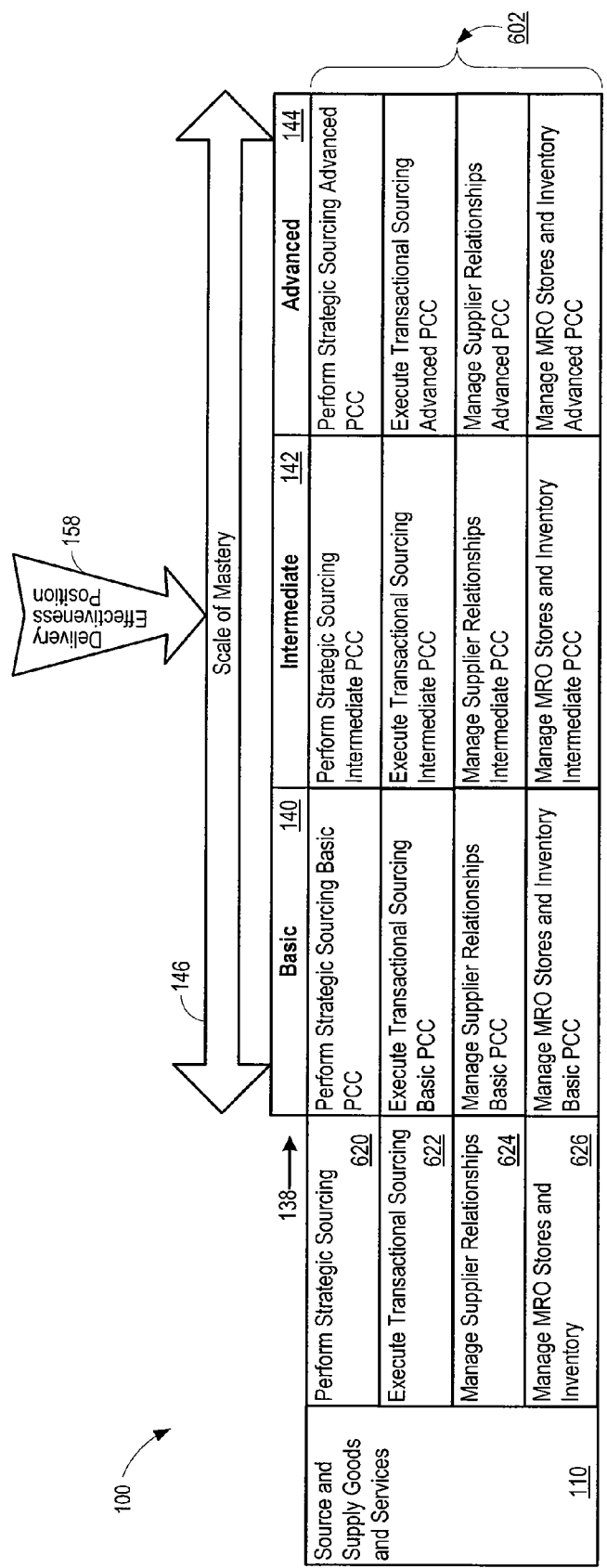
FIG. 6 shows a high performance capability assessment model with source and supply goods and services capabilities shown.

FIG. 6 shows the source and supply goods and services platform 110 divided into respective capability areas 602. The source and supply goods and services platform 110 includes a perform strategic sourcing capability 620, an execute transactional sourcing capability 622, a manage supplier relationships capability 624, and a manage MRO stores and inventory capability 626.

Figure 7:
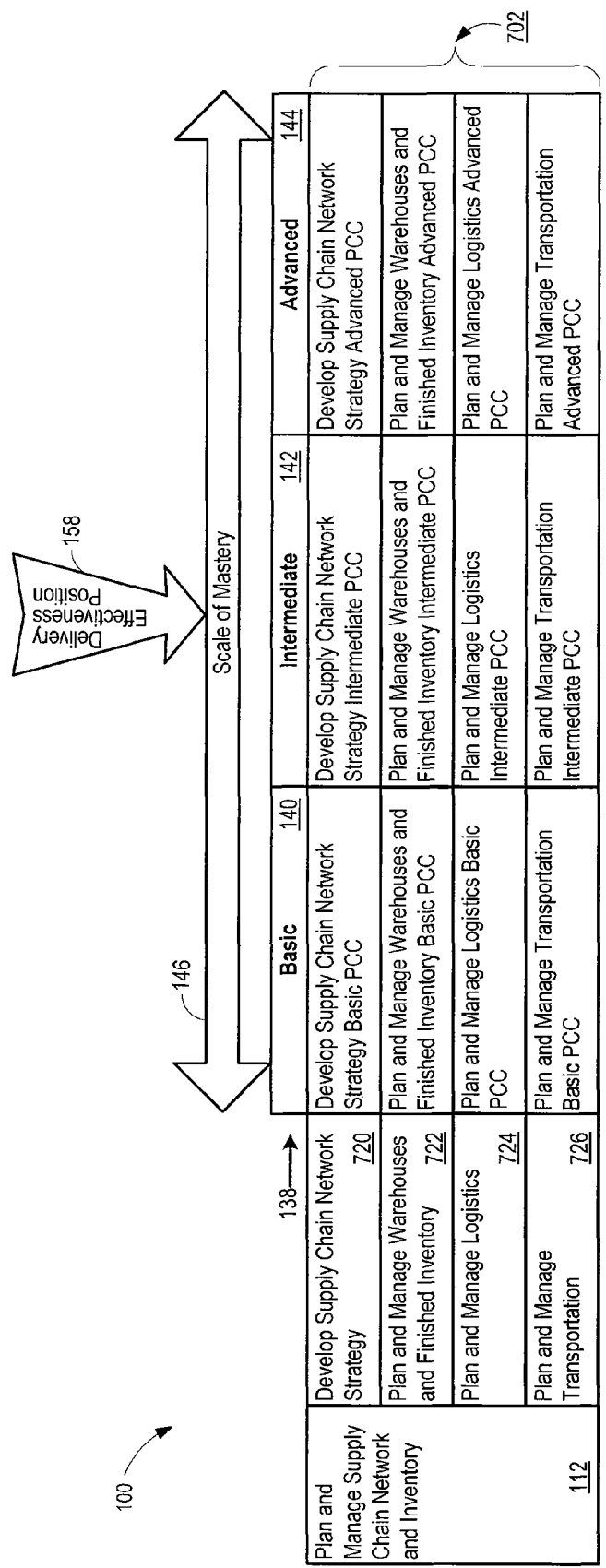
FIG. 7 shows a high performance capability assessment model with plan and manage supply chain network and inventory capabilities shown.

FIG. 7 shows the plan and manage supply chain network and inventory platform 112 divided into respective capability areas 702. The plan and manage supply chain network and inventory platform 112 includes a develop supply chain network strategy capability 720, a plan and manage warehouses and finished inventory capability 722, a plan and manage logistics capability 724, and a plan and manage transportation capability 726.

Figure 8:
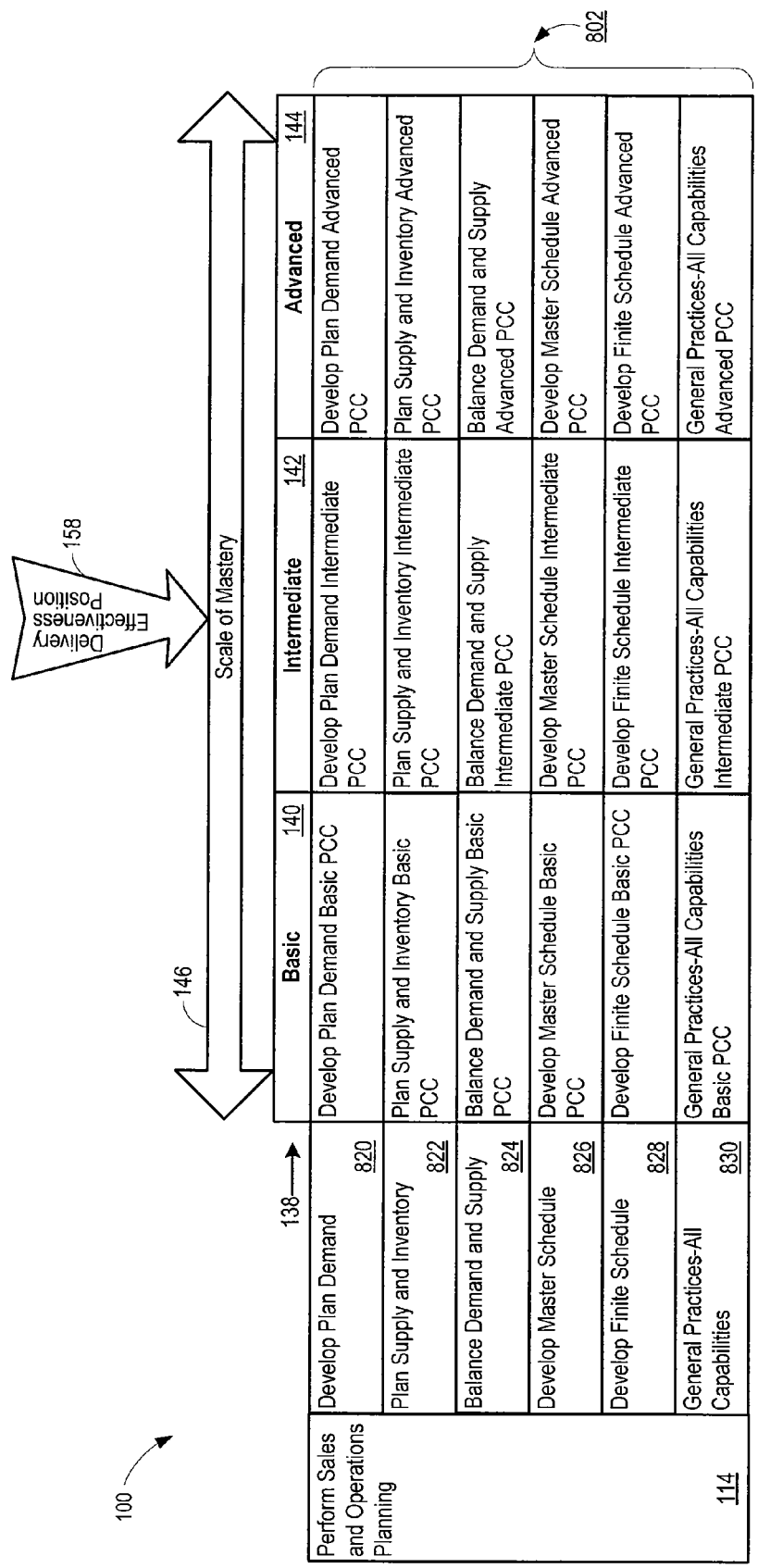
FIG. 8 shows a high performance capability assessment model with perform sales and operations planning capabilities shown.

FIG. 8 shows the perform sales and operations planning platform 114 divided into respective capability areas 802. The perform sales and operations planning platform 114 includes a develop plan demand capability 820, a plan supply and inventory capability 822, a balance demand and supply capability 824, a develop master schedule capability 826, a develop finite schedule capability 828, and a general practices-all capabilities capability 830.

Figure 9:
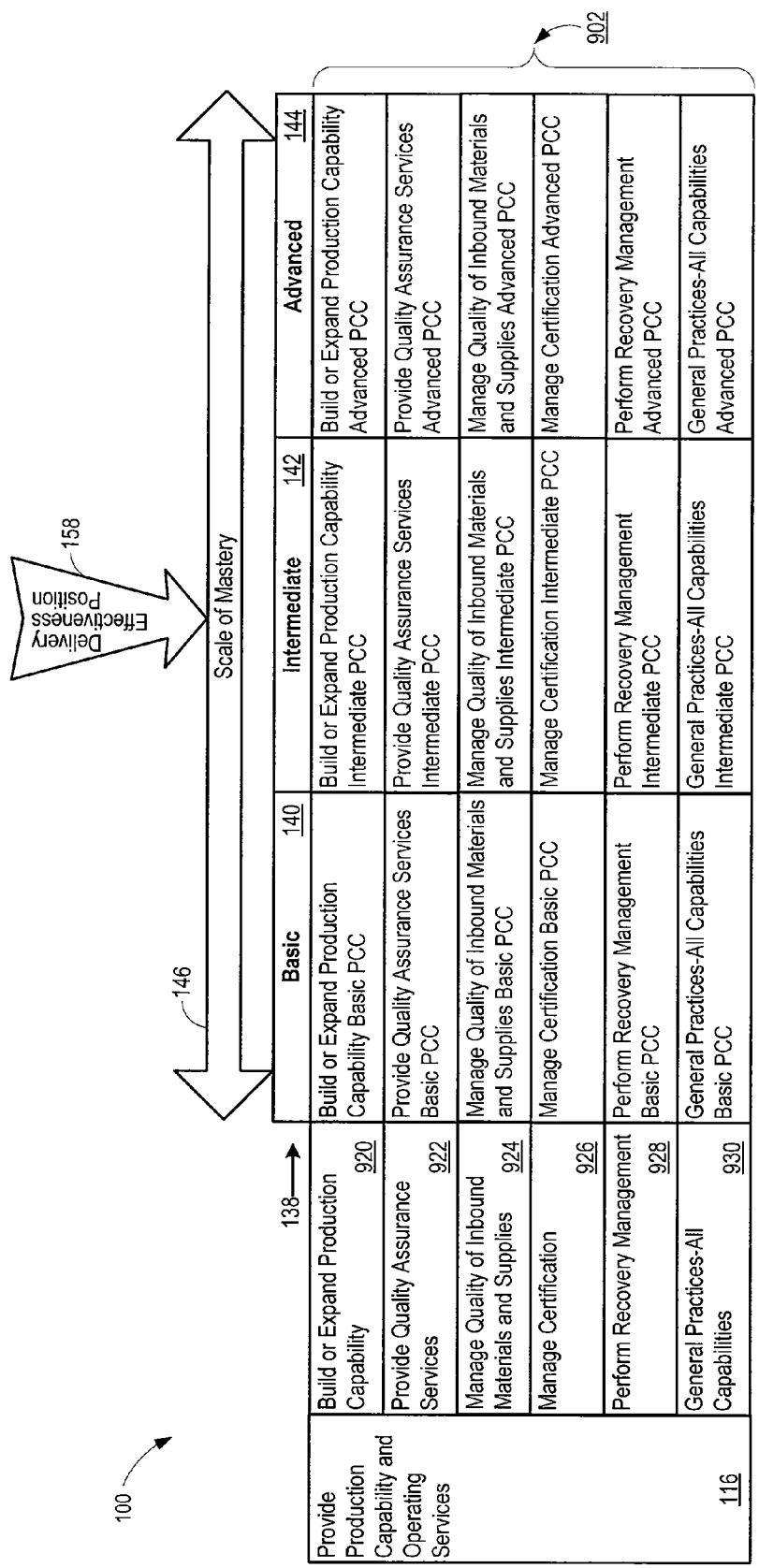
FIG. 9 shows a high performance capability assessment model with provide production capability and operating services capabilities shown.

FIG. 9 shows the provide production capability and operating services platform 116 divided into respective capability areas 902. The provide production capability and operating services platform 116 includes a build or expand production capability capability 920, a provide quality assurance services capability 922, a manage quality of inbound materials and supplies capability 924, a manage certification capability 926, a perform recovery management capability 928, and a general practices-all capabilities capability 930.

Figure 10:
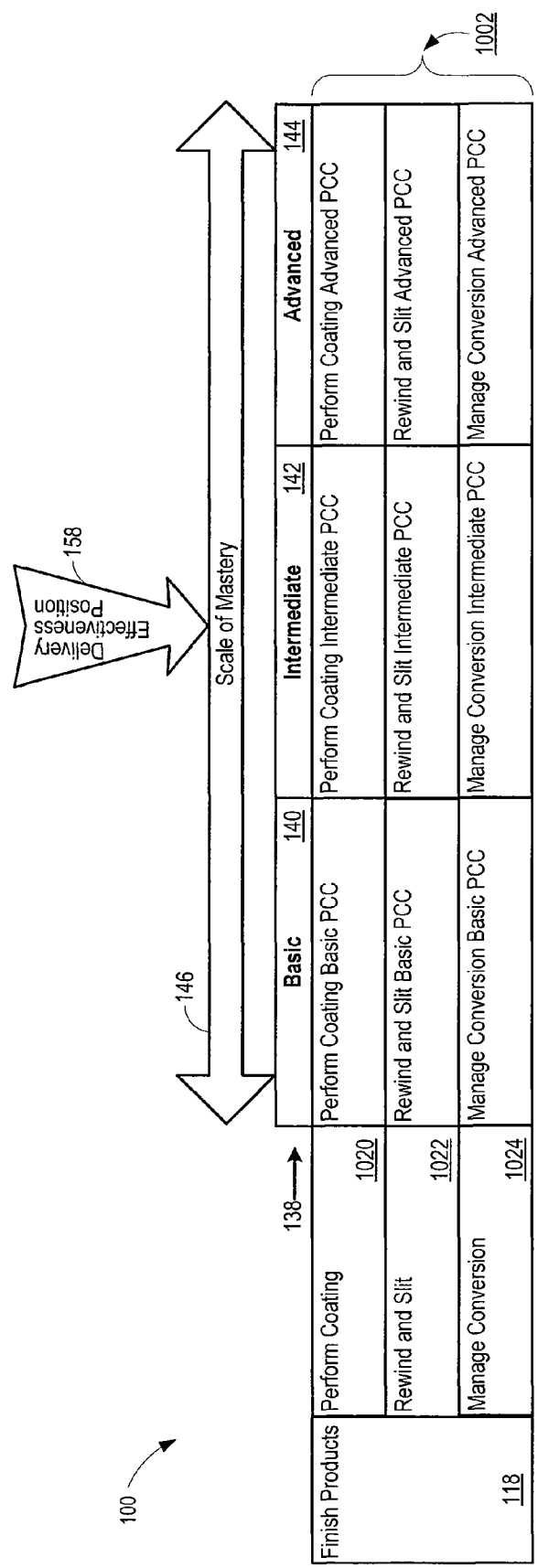
FIG. 10 shows a high performance capability assessment model with finish products capabilities shown.

FIG. 10 shows the finish products platform 118 divided into respective capability areas 1002. The finish products platform 118 includes a perform coating capability 1020, a rewind and slit capability 1022, and a manage conversion capability 1024.

Figure 11:
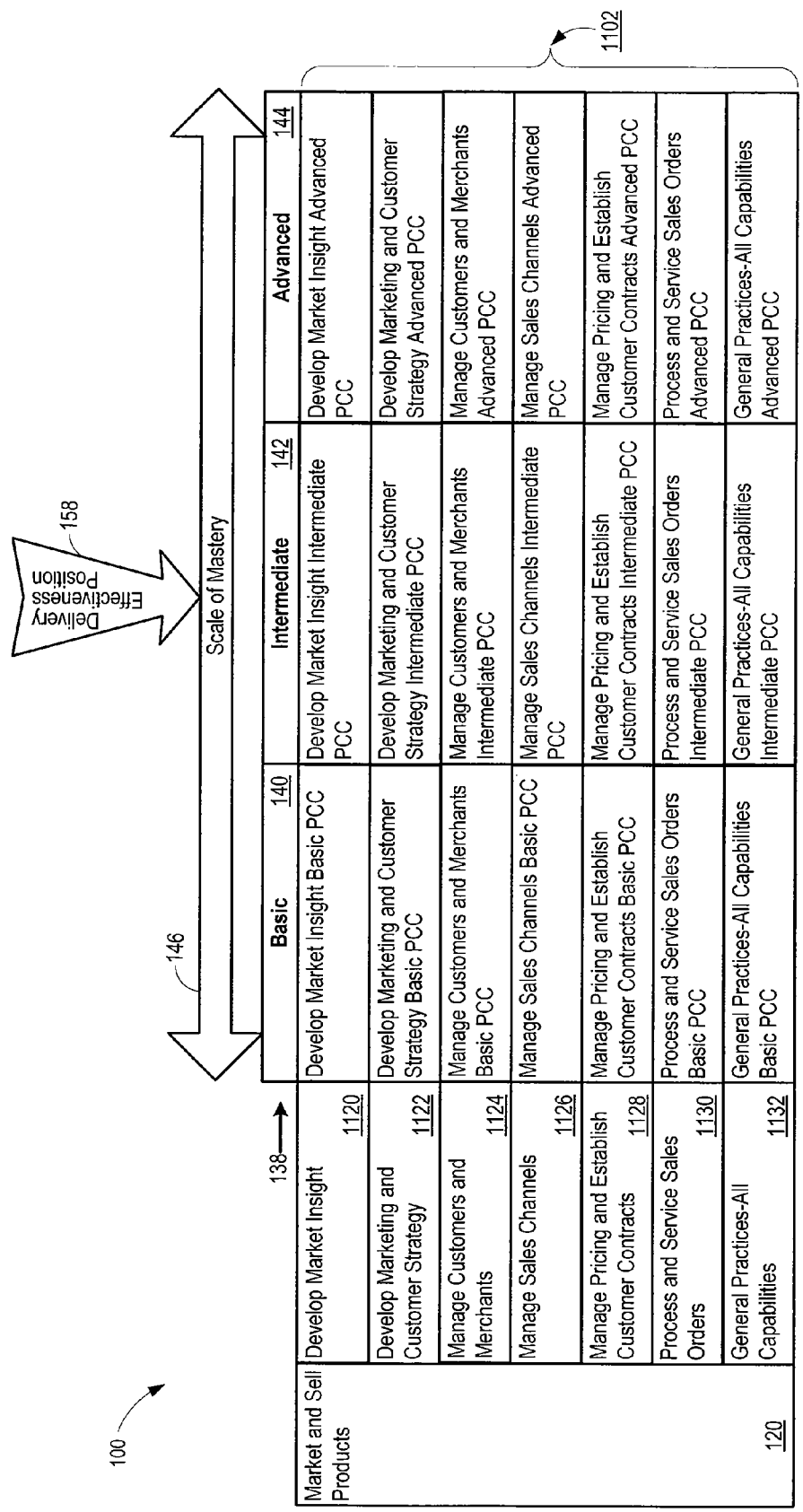
FIG. 11 shows a high perform capability assessment model with market and sell products capability shown.

FIG. 11 shows the market and sell products platform 120 divided into respective capability areas 1102. The market and sell products platform 120 includes a develop market insight capability 1120, a develop marketing and customer strategy capability 1122, a manage customers and merchants capability 1124, a manage sales channels capability 1126, a manage pricing and establish customer contracts capability 1128, a process and service sales orders capability 1130, and a general practices-all capabilities capability 1132.

The tables provided in the appendix listing immediately following the abstract, which form part of this disclosure, provide an explanation of the capabilities and corresponding key assessment areas and performance criteria for each capability within the respective platforms. Each capability may include one or more key assessment areas. Each key assessment area may include one or more additional key assessment areas. In other words, a business capability may include sub-capabilities, and therefore, key assessment areas corresponding to the multiple sub-capabilities. The tables in the appendix show specific criteria used to analyze each capability.

Figure 12:
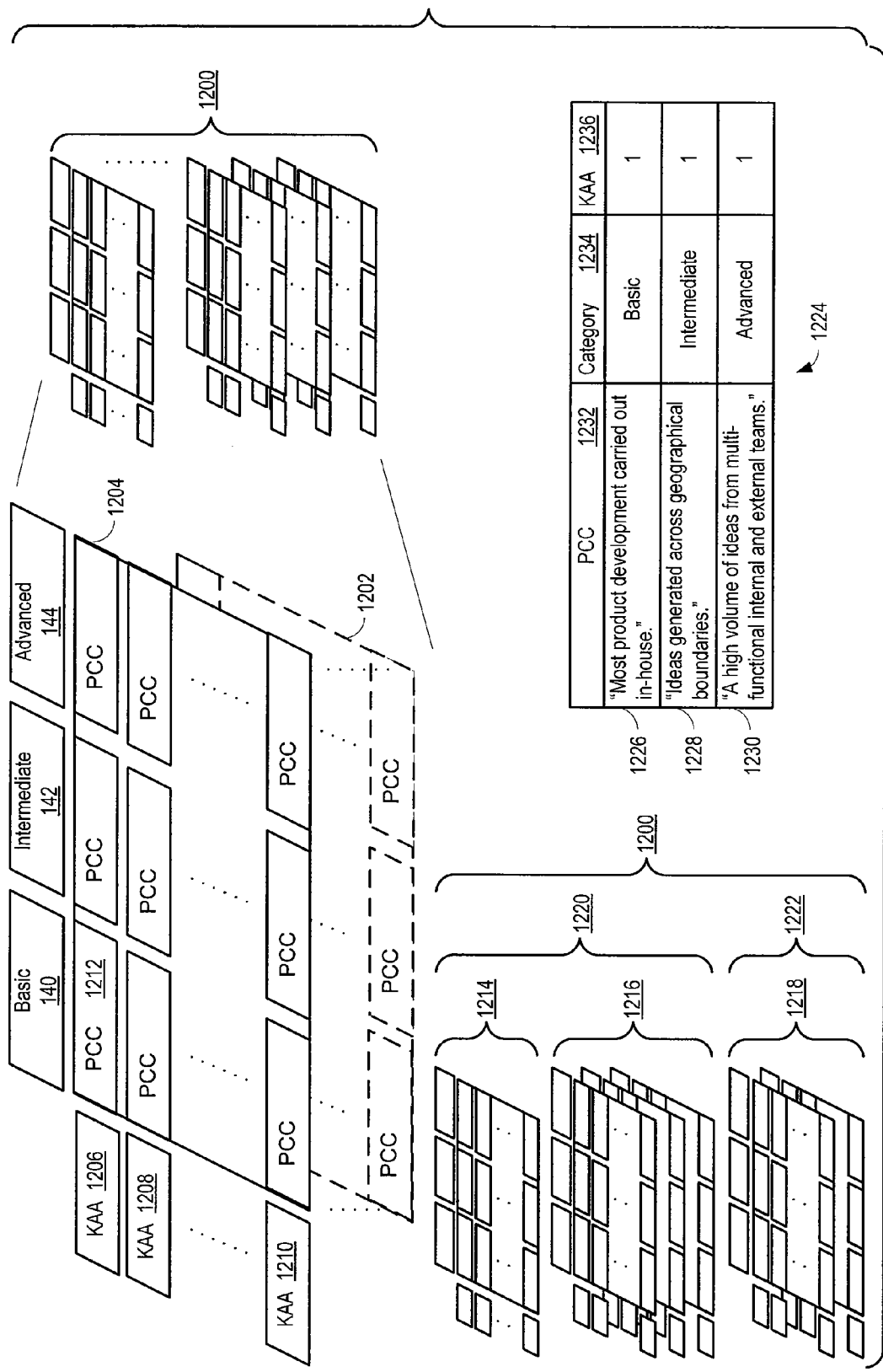
FIG. 12 shows a capability detail pool providing a multidimensional pulp and paper industry performance reference set where multiple key assessment performance reference tables are collected and stored.

FIG. 12 shows a multidimensional pulp and paper industry performance reference set 1200 ("reference set 1200") that provides a capability detail pool from which the system described below may obtain benchmarking tables for a pulp and paper business. The reference set 1200 includes multiple key assessment performance reference tables ("reference tables"), two of which are labeled 1202 and 1204. Each reference table may provide the benchmarking criteria for a specific capability, such as those noted above with respect to FIGS. 2-11.

One dimension of each table may establish the 'Basic' performance level 140 specifying 'Basic' performance assessment criteria, the 'Intermediate' performance level 142 specifying 'Intermediate' performance assessment criteria, and the 'Advanced' performance level 144 specifying 'Advanced' performance assessment criteria. Another dimension of each table may specify one or more key assessment areas (KAAs), several of which are labeled 1206, 1208, and 1210. As noted above, performance criteria, e.g., the PCC 1212, populates each key assessment performance reference table to provide benchmark criteria for 'Basic', 'Intermediate', and 'Advanced' characteristics.

The reference set 1200 represents the HPCA model 100. Consistent with the HPCA model 100, the reference set 1200 may organize multiple reference tables into a hierarchical structure defining discrete changes in granularity. In one implementation, the hierarchical structure includes reference tables, sub-platforms, platforms, and models. FIG. 12 labels three sub-platforms 1214, 1216, and 1218. The reference set 1200 may further organize the sub-platforms into platforms, two of which are labeled 1220 and 1222. Platforms aggregate into the HPCA model 100 and corresponding reference set 1200. Additional, different, or fewer levels of granularity may be defined in the HPCA model 100.

The reference set 1200 may dynamically populate the reference tables with the most up-to-date performance criteria, for example upon retrieval and presentation by a business analysis consultant. The performance criteria may be retrieved from a performance capability criteria database or other information source.

FIG. 12 also shows an example of a database implementation 1224 of a portion of a reference table. In particular, the database implementation 1224 includes records (e.g., the records 1226, 1228, 1230) that establish each PCC 1212. In the example shown, each record includes a PCC field 1232, a category specifier field 1234, and a KAA specifier field 1236. Other fields may be provided, such as a reference table assignment field or reference set assignment field. The records categorize each PCC into a specific category (e.g., Basic), into a specific KAA, and, optionally, into a specific reference table in a specific reference set for any particular HPCA model.

Figure 13:
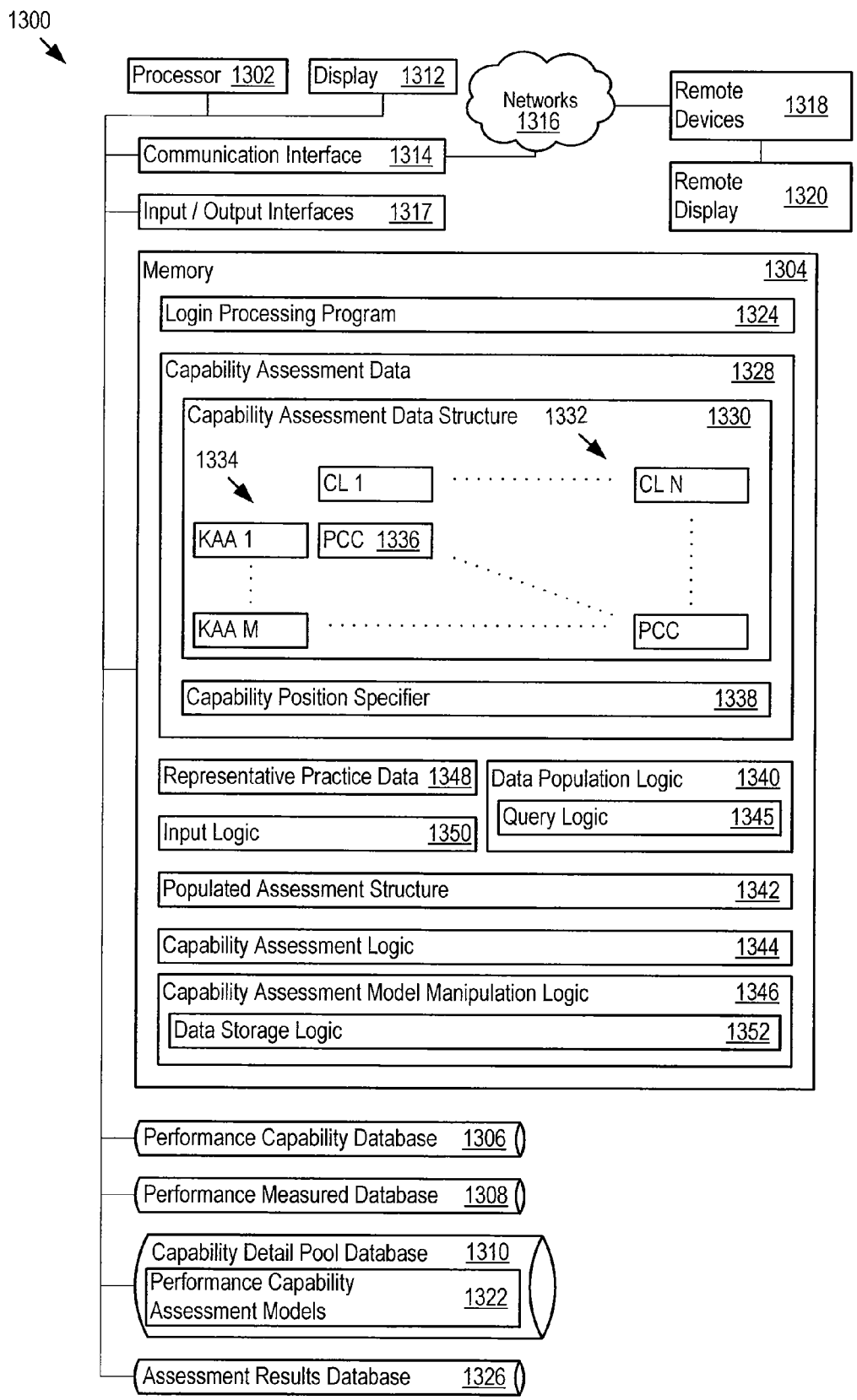
FIG. 13 shows a capability assessment system.

FIG. 13 shows a high-performance capability assessment system ("system") 1300. The system 1300 includes a processor 1302 and a memory 1304. Several databases support the operation of the system 1300, including a performance capability database 1306, a performance measured database 1308, a capability detail pool database 1310, and an assessment results database 1326. The system 1300 may include a local display 1312 and input/output interfaces 1317 (e.g., including a keyboard, mouse, microphone, speakers, or other device), and, through the communication interface 1314 and networks 1316, may communicate with remote devices 1318 and remote displays 1320. The networks 1316 may be any combination of external networks (e.g., the Internet) and internal networks (e.g., corporate LANs). The displays 1312 and 1320 may, for example, present performance capability assessment models 1322 that the system 1300 retrieves from the capability detail pool database 1310 for review, modification, and application by process engineers or other individuals. With regard to local access or access by the remote devices 1318, the system 1300 may include a login processing program 1324 to authenticate and/or authorize access to the system 1300. To that end, the login processing program 1324 may include username/password verification, private/public key encryption, or other validation and data protection capabilities.

In one implementation, the capability performance database 1306 stores performance criteria. As will be described in more detail below, the system 1300 may populate performance capability assessment models with performance capability criteria suited to any particular platform (e.g., pulp fiber 102, manage fiber supply 104, produce rolls 106, etc.) and business capability at one or more capability levels across one or more key assessment areas. The performance measured database 1308 may store the determined, measured, or otherwise ascertained characteristics, criteria, and other measured data of a particular key assessment area as representative practice data 1348. The representative practice data 1348 may be obtained through interviews with business consultants and industrial engineers, through online questionnaires, through manual or automated analysis of business data (e.g., year end operating reports), or in other manners. The capability detail pool database 1310 stores the capability detail pool 1200, which includes pre-defined performance capability assessment models 1322. The assessment results database 1326 stores determined capability levels for specific capabilities that have been analyzed.

The system 1300 facilitates the review, modification, creation, and application of performance capability assessment models. In that role, performance capability assessment model manipulation logic ("manipulation logic") 1346 within the system 1300 creates, retrieves, and stores capability assessment data 1328 in the memory 1304. The manipulation logic 1346 may establish capability assessment data 1328 in the memory 1304, including a capability assessment data structure 1330 with multiple capability levels ("CL") 1332 organized along a scale of mastery dimension, multiple key assessment areas ("KAA") 1334 organized along a key factor dimension, and performance criteria ("PCC") 1336 that populates the performance capability assessment model 1330. The manipulation logic 1346 may vary widely in implementation, and, as one example, may include data storage logic 1352 that saves data in memory and user interface logic that accepts capability level specifications, key assessment area specifications and performance capability criteria inputs to create new performance capability assessment models, modify existing performance capability assessment models, delete performance capability assessment models, or retrieve performance capability assessment models for review.

In one implementation, the manipulation logic 1346 establishes the capability assessment data structure 1330 to include a multidimensional pulp and paper industry performance reference set that includes multiple key assessment performance reference tables in which the key assessment performance reference tables include a 'Basic' capability performance level, an 'Intermediate' capability performance level, and an 'Advanced' capability performance level.

The capability assessment data 1328 may also include a capability position specifier 1338. The capability position specifier 1338 may record the capability level along the scale of mastery 146, as determined for any particular capability. Thus, the system 1300 may store the performance level in the assessment results database 1326 or elsewhere for future retrieval and review.

In one implementation, the data population logic 1340 may be a data population program executed by the processor 1302 that populates template performance capability assessment models. For example, the data population logic 1340 may include input logic 1350 that accepts input specifying a capability of interest that indicates a particular performance capability assessment model. The data population logic 1340 may include query logic 1345 that executes database queries and prompts a user for input to obtain the corresponding performance capability criteria for the capability of interest.

In another implementation, for example, the query logic 1345 may receive an input specifying a pulp and paper industry area and a pulp and paper industry key assessment area with the pulp and paper industry area for analysis. The query logic 1345 searches the multidimensional pulp and paper industry performance reference set for a matching key assessment performance reference table that matches the pulp and paper industry area and the pulp and paper industry key assessment area, and retrieves the matching key assessment performance reference table.

The data population logic 1340 may further include storage logic that adds the retrieved performance capability criteria to the template performance capability assessment model. The data population logic 1340 produces populated performance capability assessment structures 1342 that may be stored in the capability detail pool database 1310.

In addition to the analysis process described above, the system 1300 may provide an automated analysis of representative practice data 1348 that identifies relevant performance capability criteria and determines the position on the scale of mastery 146 of each key assessment area corresponding to the performance capability criteria for the representative practice data 1348. As one example, the system 1300 may implement capability assessment logic 1344 that includes comparison and/or matching logic that analyzes the representative practice data 1348 with respect to performance capability criteria to locate key assessment areas for which the system 1300 can determine capability levels to obtain a resultant performance level for each key assessment area.

Furthermore, the capability assessment logic 1344 may determine an overall position on the scale of mastery 146 as the capability position specifier 1338, for a capability under examination given the knowledge of where the key assessment areas corresponding to the capability under examination fall in each capability level. Thus, for example, the capability assessment logic 1344 may determine an overall capability level for a capability corresponding to the capability level for the majority of the key assessment areas, or it may apply a weighted analysis technique to give more emphasis to some key assessment areas than others in determining the overall position on the scale of mastery 146 for a capability. As another example, the capability assessment logic 1344 may implement an expert system (e.g., based on a neural network trained on prior determinations) that analyzes the determined characteristics with respect to the performance capability criteria and ascertains where the capability under examination falls along the scale of mastery 146 for each of the key assessment areas, or overall on the scale of mastery.

Figure 14:
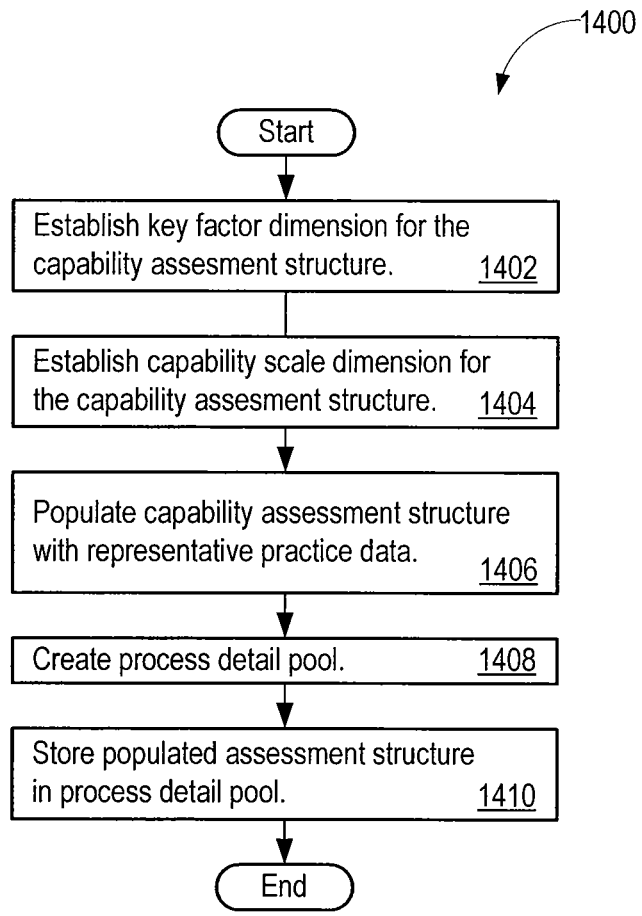
FIG. 14 shows a flow diagram for establishing high-performance capability assessment models.

FIG. 14 shows a flow diagram 1400 for creating performance capability assessment models. The performance capability assessment model creator (e.g., the manipulation logic 1346) establishes a key factor dimension for the performance capability assessment model (1402). The performance capability assessment model creator also establishes a capability scale dimension for the performance capability assessment model (1404). The capability scale dimension may define a scale of increasing organizational capability. For example, the structure creator may create the 'Basic' level 140, the 'Intermediate' level 142, and the 'Advanced' level 144. The performance capability assessment model creator also populates the performance capability assessment model with capability performance criteria (1406). A capability detail pool 1200 may be formed to hold multiple tailored key assessment performance reference tables (1408). The performance capability assessment model creator may store the populated assessment structure in the capability detail pool for subsequent retrieval and analysis (1410).

Figure 15:
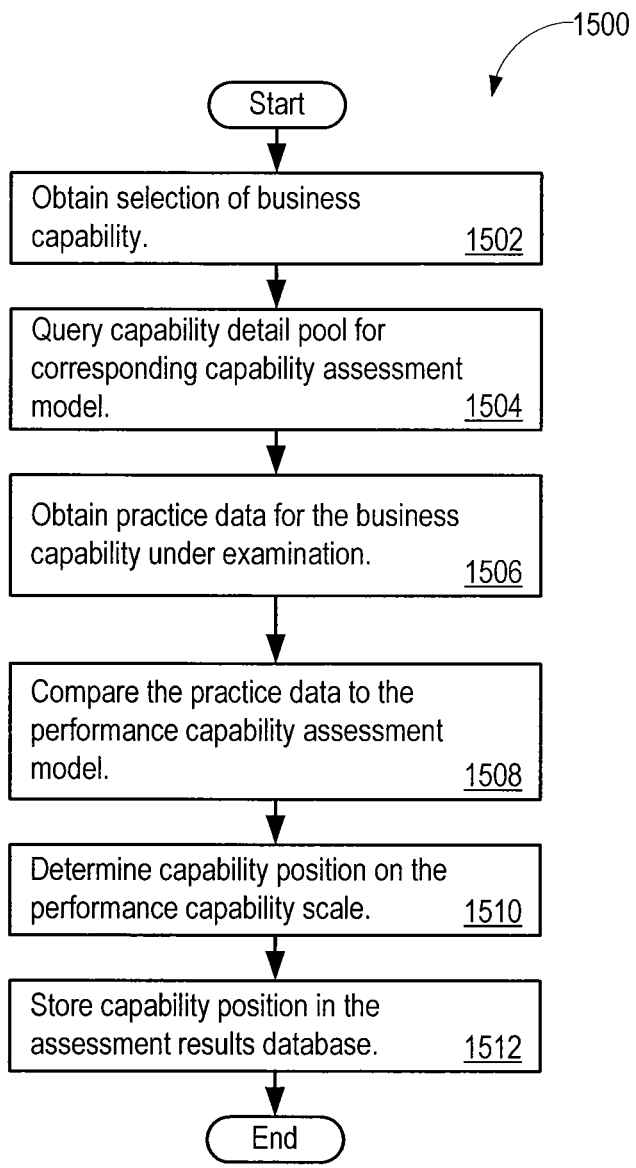
FIG. 15 shows a flow diagram for retrieving and applying high performance capability assessment models.

FIG. 15 shows a flow diagram 1500 for retrieving and applying performance capability assessment models. A selection of a capability to be analyzed is obtained (1502). In one implementation, the system 1300 receives input data that specifies a pulp and paper industry area and a pulp and paper industry key assessment area for analysis. For example, the system 1300 may accept input from a business consultant that specifies a capability for analysis. The system 1300 may query the capability detail pool 1200 for a corresponding performance capability assessment model (1504). The corresponding performance capability assessment model may be pre-defined in the capability detail pool 1200, or the data population logic 1340 (or other actor) may populate a performance capability assessment model template that the system 1300 newly creates, or that the system 1300 retrieves from a data store, such as the capability detail pool database 1310.

In another example, the system 1300 searches the multidimensional pulp and paper industry performance reference set in the capability detail pool 1200 for a matching key assessment performance reference table based on the input data that specifies a pulp and paper industry platform and a pulp and paper industry key assessment area. The system 1300 retrieves the matching key assessment performance reference table and initiates analysis of the matching key assessment performance reference table to obtain a resultant performance level for the pulp and paper industry key assessment area.

The system 1300 obtains representative practice data 1348 for the capability under examination in the specific business under review (1506). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 1300 may retrieve the representative practice data 1348 from a database of previously obtained representative practice data.

The system 1300 compares the representative practice data 1348 to the performance criteria in the performance capability assessment model (1508). For example, a business consultant may use his or her expertise to arrive at a determination of level for the business and the capability under examination (1510). Alternatively or additionally, the capability assessment logic 1344 may perform an automated analysis of the assessment results data in the assessment results database 1326 and ascertain the performance level on the scale of mastery 146. The system 1300 may store the assessment results, including the determined performance level, for future reference in the assessment results database 1326 or other location (1512).

Figure 16:
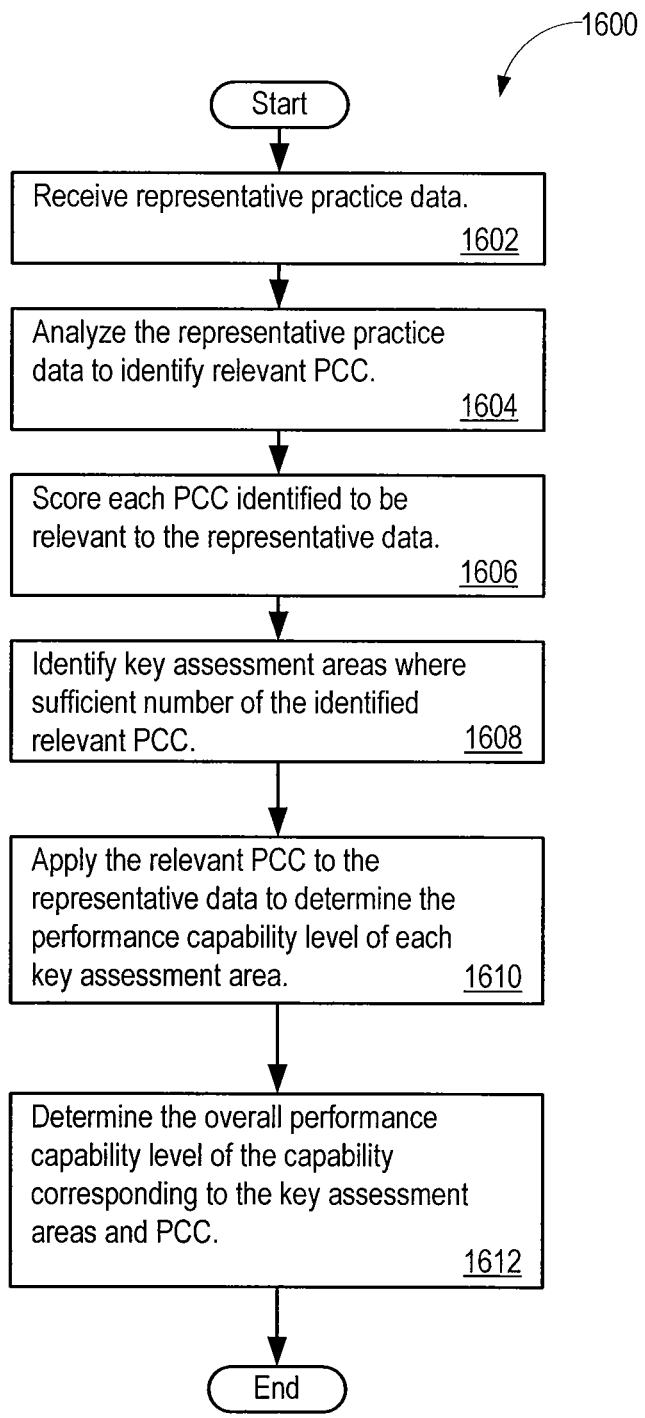
FIG. 16 shows a flow diagram for analyzing representative practice data to determine a pulp and paper industry and a pulp and paper key assessment area to which the representative practice data applies.

FIG. 16 shows a flow diagram 1600 for analyzing representative practice data 1348 to determine a pulp and paper industry and a pulp and paper key assessment area to which the representative practice data applies. The system 1300 receives representative practice data 1348 as input data (1602). The system 1300 may receive the representative practice data 1348 from a database query performed by the query logic 1345 that the query logic executes periodically, when instructed by an operator, and/or automatically against any number of available database sources that store representative practice data 1348. The capability assessment logic 1344 analyzes the representative practice data 1348 to identify performance capability criteria in the capability detail pool 1200 that the capability assessment logic 1344 determines relevant to the representative practice data 1348 (1604). For example, the capability assessment logic 1344 may compare and/or match the content of the representative practice data 1348 with the performance capability criteria using natural language processing (NLP), text string and/or substring matching, by comparing tags linked to the representative practice data 1348 and that specify that any portion of the representative practice data 1348 is applicable to a specific PCC, by querying for a manual classification of the representative practice data 1348 to a PCC, or other matching technique. The capability assessment logic 1344 may score and/or weight a performance capability criteria and compare the score and/or weight to a user specified relevance threshold to rank the relevance of the performance capability criteria to the representative practice data 1348 (1606). The user may specify particular terms and/or phrases to search and match between the performance capability criteria and the representative practice data 1348, in order to score the performance capability criteria.

The capability assessment logic 1344 may determine, based on the number of performance capability criteria that meet or exceed the relevance threshold, that the capability assessment logic 1344 has identified a sufficient number of performance capability criteria for a specific key assessment area in order to determine a performance level for the capability as a whole or any key assessment area within the capability (1608). As one example, where at least 51% of the performance capability criteria for a particular key assessment area meet or exceed the relevance threshold, the capability assessment logic 1344 applies the performance capability criteria to the representative practice data 1348. In another example, the performance capability criteria for a particular key assessment area may be ranked in importance and/or designated as mandatory in order to assess the key assessment area. In the event the capability assessment logic 1344 identifies the mandatory performance capability criteria for a key assessment area, the capability assessment logic 1344 applies the performance capability criteria to the representative practice data 1348.

The capability assessment logic 1344 may apply the performance capability criteria meeting or exceeding the relevance threshold to the representative practice data 1348 to determine whether any particular PCC is met. Accordingly, as the capability assessment logic 1344 analyzes the PCC, the system 1300 tracks the best fit of the representative practice data 1348 to the PCCs in the key assessment performance reference tables. In other words, the system 1300 determines how the representative practice data 1348 meets (or does not meet) each PCC, thereby gaining insight into whether the representative practice data 1348 is indicative of Basic, Intermediate, or Advanced practices.

The system 1300 may also gauge the position on the scale of mastery 146 of each key assessment area corresponding to the performance capability criteria (1610). The capability assessment logic 1344 may further determine an overall position on the scale of mastery 146 for a capability (1612). The capability assessment logic 1344 may establish that a desired number and/or designated mandatory performance capability criteria for the key assessment areas have been identified as relevant to a capability and sufficient to determine the position on the scale of mastery 146 for the capability. For example, the capability assessment logic 1344 may determine an overall performance level for the capability based on the performance level determined for the majority of the key assessment areas. The capability assessment logic 1344 may apply a weighted analysis technique to give more emphasis to some key assessment areas than others in determining the overall position on the scale of mastery 146 for the capability.

Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 1300 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be combined or split among multiple programs, or distributed across several memories and processors.

The HPCA 100 model provides unexpectedly good results for a performance capability assessment model, particularly in the pulp and paper industry. In particular, the combinations of key assessment areas and particular assessment criteria of the HPCA model, including the criteria noted in the Appendix of Tables, provide significant advantages over other assessment models. The unexpectedly good results include clearly identifying and delineating from among multiple related complex processes the specific processes to improve, how to improve said process, and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

APPENDIX OF TABLES

Lengthy table referenced here

US08442857-20130514-T00001

Please refer to the end of the specification for access instructions.

Lengthy table referenced here

US08442857-20130514-T00002

Please refer to the end of the specification for access instructions.

Lengthy table referenced here

US08442857-20130514-T00003

Please refer to the end of the specification for access instructions.

Lengthy table referenced here

US08442857-20130514-T00004

Please refer to the end of the specification for access instructions.

Lengthy table referenced here

US08442857-20130514-T00005

Please refer to the end of the specification for access instructions.

Lengthy table referenced here

US08442857-20130514-T00006

Please refer to the end of the specification for access instructions.

Lengthy table referenced here

US08442857-20130514-T00007

Please refer to the end of the specification for access instructions.

Lengthy table referenced here

US08442857-20130514-T00008

Please refer to the end of the specification for access instructions.

Lengthy table referenced here

US08442857-20130514-T00009

Please refer to the end of the specification for access instructions.

Lengthy table referenced here

US08442857-20130514-T00010

Please refer to the end of the specification for access instructions.

LENGTHY TABLES

The patent contains a lengthy table section. A copy of the table is available in electronic form from the USPTO web site (http://seqdata.uspto.gov/?pageRequest=docDetail&DocID=US08442857B1). An electronic copy of the table will also be available from the USPTO upon request and payment of the fee set forth in 37 CFR 1.19(b)(3).

We claim:

1. A computer implemented method for high performance capability assessment of a pulp and paper industry, comprising:

defining, by a processor coupled to a machine-readable memory, a multidimensional pulp and paper industry performance reference set stored in the memory and comprising multiple key assessment performance reference tables, at least one key assessment performance reference table further defining a pulp fiber platform including:

a 'Basic' performance level specifying 'Basic' performance assessment criteria;

an 'Intermediate' performance level specifying 'Intermediate' performance assessment criteria;
an 'Advanced' performance level specifying 'Advanced' performance assessment criteria;
establishing wood and chip handling assessment criteria,
wherein the 'Basic' performance assessment criteria includes a first criteria where wood preparation for logs shorting, de-barking and logs chipping is done at mill site;
wherein the 'Intermediate' performance assessment criteria includes a first criteria where wood logs shorting and chipping is performed at mill site;
wherein the 'Advanced' performance assessment criteria includes a first criteria where wood preparation is performed at forest site and chips are transported to mill site directly;
receiving, through a communication interface coupled to the processor, an input specifying a pulp and paper industry area and a pulp and paper industry key assessment area with the pulp and paper industry area for analysis;
searching, by the processor, the multidimensional pulp and paper industry performance reference set for a matching key assessment performance reference table that matches the pulp and paper industry area and the pulp and paper industry key assessment area;
retrieving, by the processor, the matching key assessment performance reference table;
analyzing, by the processor, the matching key assessment performance reference table; and
obtaining, by the processor, a resultant performance level for the pulp and paper industry key assessment area.

2. The computer implemented method of claim 1, further including establishing mechanical pulping assessment criteria,
wherein the 'Basic' performance assessment criteria includes a first criteria where stone ground wood pulping process is used; and
wherein the 'Intermediate' performance assessment criteria includes a first criteria where refiner mechanical pulping is used with partial automation of process; and
wherein the 'Advanced' performance assessment criteria includes a first criteria where TMP and BCTMP are advance processes in mechanical pulping using fully automated refiner operation.

3. The computer implemented method of claim 1, further including establishing pulp washing assessment criteria, wherein the 'Basic' performance assessment criteria includes a first criteria where for efficient washing of pulp, and spent liquor dilution is increased; wherein the 'Intermediate' performance assessment criteria includes a first criteria where good washing efficiency with comparatively low spent liquor dilution exists; wherein the 'Advanced' performance assessment criteria includes a first criteria where pressure washing and belt washing process is available, providing good washing efficiency at minimum spent liquor dilution.

4. A computer implemented method for high performance capability assessment of a pulp and paper industry, comprising:
defining, by a processor coupled to a machine-readable memory, a multidimensional pulp and paper industry performance reference set stored in the memory and comprising multiple key assessment performance reference tables, at least one key assessment performance reference table further defining a pulp fiber platform including:
a 'Basic' performance level specifying 'Basic' performance assessment criteria;
an 'Intermediate' performance level specifying 'Intermediate' performance assessment criteria;
an 'Advanced' performance level specifying 'Advanced' performance assessment criteria;
establishing secondary fiber handling and processing assessment criteria,
wherein the 'Basic' performance assessment criteria includes a first criteria where collection is randomly performed by dealers and brokers;
wherein the 'Intermediate' performance assessment criteria includes a first criteria where the collection process is partially structured, material is shorted by supplier based on it usage at mill;
wherein the 'Advanced' performance assessment criteria includes a first criteria where the collection process is structured and waste fiber is shorted at the point of sourced and then collected; and
receiving, through a communication interface coupled to the processor, an input specifying a pulp and paper industry area and a pulp and paper industry key assessment area with the pulp and paper industry area for analysis;
searching, by the processor, the multidimensional pulp and paper industry performance reference set for a matching key assessment performance reference table that matches the pulp and paper industry area and the pulp and paper industry key assessment area;
retrieving, by the processor, the matching key assessment performance reference table;
analyzing, by the processor, the matching key assessment performance reference table; and
obtaining, by the processor, a resultant performance level for the pulp and paper industry key assessment area.

5. A computer implemented method for high performance capability assessment of a pulp and paper industry, comprising:
defining, by a processor coupled to a machine-readable memory, a multidimensional pulp and paper industry performance reference set stored in the memory and comprising multiple key assessment performance reference tables, at least one key assessment performance reference table further defining a pulp fiber platform including:
a 'Basic' performance level specifying 'Basic' performance assessment criteria;
an 'Intermediate' performance level specifying 'Intermediate' performance assessment criteria;
an 'Advanced' performance level specifying 'Advanced' performance assessment criteria;
establishing pulping process assessment criteria,
wherein the 'Basic' performance assessment criteria includes a first criteria where sulfite process and Kraft pulping process in batch mode having total manual operation exists; and
wherein the 'Intermediate' performance assessment criteria includes a first criteria where Kraft pulping process having partially automated digester operation exists; and
wherein the 'Advanced' performance assessment criteria includes a first criteria where Kraft pulping process using RDH/super batch process with automated Digester operation control exists; and
receiving, through a communication interface coupled to the processor, an input specifying a pulp and paper industry area and a pulp and paper industry key assessment area with the pulp and paper industry area for analysis;

searching, by the processor, the multidimensional pulp and paper industry performance reference set for a matching key assessment performance reference table that matches the pulp and paper industry area and the pulp and paper industry key assessment area;

retrieving, by the processor, the matching key assessment performance reference table;

analyzing, by the processor, the matching key assessment performance reference table; and obtaining, by the processor, a resultant performance level for the pulp and paper industry key assessment area.

6. A non-transitory computer-readable memory or data storage means encoded with data representing a computer program for a high-performance capability assessment of a pulp and paper industry, the computer-readable memory or data storage means causing the computer to perform the acts of:

providing a processor operatively coupled to a communication network;

providing one or more databases operatively coupled to the processor and accessible through the communication network;

coupling an interface to the processor for receiving input;

establishing a machine-readable memory in said one or more databases, including a multidimensional pulp and paper industry performance reference set comprising multiple key assessment performance reference tables, at least one key assessment performance reference table defining a pulp fiber platform, including:

a 'Basic' performance level specifying 'Basic' performance assessment criteria;

an 'Intermediate' performance level specifying 'Intermediate' performance assessment criteria;

an 'Advanced' performance level specifying 'Advanced' performance assessment criteria;

establishing wood and chip handling criteria, wherein the 'Basic' performance assessment criteria includes a first criteria where wood preparation for logs shorting, de-barking and logs chipping is done at mill site;

wherein the 'Intermediate' performance assessment criteria includes a first criteria where wood logs shorting and chipping is performed at mill site;

wherein the 'Advanced' performance assessment criteria includes a first criteria where wood preparation is performed at forest site and chips are transported to mill site directly;

receiving an input specifying a pulp and paper industry area and a pulp and paper industry key assessment area with the pulp and paper industry area for analysis;

searching the multidimensional pulp and paper industry performance reference set for a matching key assessment performance reference table that matches the pulp and paper industry area and the pulp and paper industry key assessment area;

retrieving, by the processor, the matching key assessment performance reference table;

analyzing, by the processor, the matching key assessment performance reference table; and obtaining, by the processor, a resultant performance level for the pulp and paper industry key assessment area.

7. The non-transitory computer-readable medium of claim 6 further comprising computer-readable content to cause a computer to perform acts of establishing mechanical pulping assessment criteria, wherein the 'Basic' performance assessment criteria include a first criteria where stone ground wood pulping process is used; and wherein the 'Intermediate' performance assessment criteria includes a first criteria where refiner mechanical pulping is used with partial automation of process; and wherein the 'Advanced' performance assessment criteria includes a first criteria where TMP and BCTMP are advance processes in mechanical pulping using fully automated refiner operation.

8. The non-transitory computer-readable medium of claim 6 further comprising computer-readable content to cause a computer to perform acts of establishing pulp washing assessment criteria, wherein the 'Basic' performance assessment criteria includes a first criteria where for efficient washing of pulp, spent liquor dilution is increased; wherein the 'Intermediate' performance assessment criteria includes a first criteria where good washing efficiency with comparatively low spent liquor dilution exists; wherein the 'Advanced' performance assessment criteria includes a first criteria where pressure washing and belt washing process are available, providing good washing efficiency at minimum spent liquor dilution.

9. A non-transitory computer-readable memory or data storage means encoded with data representing a computer program for a high-performance capability assessment of a pulp and paper industry, the computer-readable memory or data storage means causing the computer to perform the acts of:

providing a processor operatively coupled to a communication network;

providing one or more databases operatively coupled to the processor and accessible through the communication network;

coupling an interface to the processor for receiving input;

establishing a machine-readable memory in said one or more databases, including a multidimensional pulp and paper industry performance reference set comprising multiple key assessment performance reference tables, at least one key assessment performance reference table defining a pulp fiber platform, including:

a 'Basic' performance level specifying 'Basic' performance assessment criteria;

an 'Intermediate' performance level specifying 'Intermediate' performance assessment criteria;

an 'Advanced' performance level specifying 'Advanced' performance assessment criteria;

establishing secondary fiber handling and processing assessment criteria, wherein the 'Basic' performance assessment criteria includes a first criteria where collection is randomly done by dealers and brokers;

wherein the 'Intermediate' performance assessment criteria includes a first criteria where collection process is partially structured, material is shorted by supplier based on it usage at mill;

wherein the 'Advanced' performance assessment criteria includes a first criteria where collection process is structured and waste fiber is shorted at the point of sourced and then collected; and receiving an input specifying a pulp and paper industry area and a pulp and paper industry key assessment area with the pulp and paper industry area for analysis;

searching the multidimensional pulp and paper industry performance reference set for a matching key assessment performance reference table that matches the pulp and paper industry area and the pulp and paper industry key assessment area;

retrieving, by the processor, the matching key assessment performance reference table;

analyzing, by the processor, the matching key assessment performance reference table; and obtaining, by the processor, a resultant performance level for the pulp and paper industry key assessment area.

10. A non-transitory computer-readable memory or data storage means encoded with data representing a computer program for a high-performance capability assessment of a pulp and paper industry, the computer-readable memory or data storage means causing the computer to perform the acts of:

providing a processor operatively coupled to a communication network;

providing one or more databases operatively coupled to the processor and accessible through the communication network;

coupling an interface to the processor for receiving input;

establishing a machine-readable memory in said one or more databases, including a multidimensional pulp and paper industry performance reference set comprising multiple key assessment performance reference tables, at least one key assessment performance reference table defining a pulp fiber platform, including:
 a 'Basic' performance level specifying 'Basic' performance assessment criteria;
 an 'Intermediate' performance level specifying 'Intermediate' performance assessment criteria;
 an 'Advanced' performance level specifying 'Advanced' performance assessment criteria;

establishing pulping process assessment criteria,
 wherein the 'Basic' performance assessment criteria includes a first criteria where Sulfite process and Kraft pulping process in batch mode having total manual operation exists; and
 wherein the 'Intermediate' performance assessment criteria includes a first criteria where Kraft pulping process having partially automated digester operation exists; and
 wherein the 'Advanced' performance assessment criteria includes a first criteria where Kraft pulping process using RDH/super batch process with automated Digester operation control exists; and receiving an input specifying a pulp and paper industry area and a pulp and paper industry key assessment area with the pulp and paper industry area for analysis;

searching the multidimensional pulp and paper industry performance reference set for a matching key assessment performance reference table that matches the pulp and paper industry area and the pulp and paper industry key assessment area;

retrieving, by the processor, the matching key assessment performance reference table;

analyzing, by the processor, the matching key assessment performance reference table; and obtaining, by the processor, a resultant performance level for the pulp and paper industry key assessment area.

11. A system for high-performance capability assessment of a pulp and paper business, comprising:

a processor operatively coupled to a communication network;

an interface coupled to the processor configured to receive input;

one or more databases operatively coupled to the processor and accessible through the communication network;

a machine-readable memory operatively located in said one or more databases, said memory including a multidimensional pulp and paper industry performance reference set comprising multiple key assessment performance reference tables, at least one key assessment performance reference table defining a pulp fiber platform, including:
 a 'Basic' performance level specifying 'Basic' performance assessment criteria;
 an 'Intermediate' performance level specifying 'Intermediate' performance assessment criteria;
 an 'Advanced' performance level specifying 'Advanced' performance assessment criteria;

the processor establishes wood and chip handling criteria,
 wherein the 'Basic' performance assessment criteria includes a first criteria where wood preparation for logs shorting, de-barking and logs chipping is done at mill site;
 wherein the 'Intermediate' performance assessment criteria includes a first criteria where wood logs shorting and chipping is performed at mill site;
 wherein the 'Advanced' performance assessment criteria includes a first criteria where wood preparation is performed at forest site and chips are transported to mill site directly;

the interface configured to receive an input specifying a pulp and paper industry area and a pulp and paper industry key assessment area with the pulp and paper industry area for analysis;

wherein the processor searches the multidimensional pulp and paper industry performance reference set for a matching key assessment performance reference table that matches the pulp and paper industry area and the pulp and paper industry key assessment area, and retrieves the matching key assessment performance reference table; and wherein the processor performs analysis of the matching key assessment performance reference table; and obtains a resultant performance level for the pulp and paper industry key assessment area.

12. The system of claim 11, wherein the processor establishes mechanical pulping criteria,
 wherein the 'Basic' performance assessment criteria includes a first criteria where stone ground wood pulping process is used; and
 wherein the 'Intermediate' performance assessment criteria includes a first criteria where refiner mechanical pulping used with partial automation of process exists; and
 wherein the 'Advanced' performance assessment criteria includes a first criteria where TMP and BCTMP are advance processes in mechanical pulping using fully automated refiner operation.

13. The system of claim 11, wherein the processor establishes pulp washing criteria, wherein the 'Basic' performance assessment criteria includes a first criteria where for efficient washing of pulp, spent liquor dilution is increased; wherein the 'Intermediate' performance assessment criteria includes a first criteria where good washing efficiency with comparatively low spent liquor dilution exists; wherein the 'Advanced' performance assessment criteria includes a first criteria where pressure washing and belt washing process are available, providing good washing efficiency at minimum spent liquor dilution.

14. A system for high-performance capability assessment of a pulp and paper business, comprising:
   a processor operatively coupled to a communication network;
   an interface coupled to the processor configured to receive input;
   one or more databases operatively coupled to the processor and accessible through the communication network;
   a machine-readable memory operatively located in said one or more databases, said memory including a multi-dimensional pulp and paper industry performance reference set comprising multiple key assessment performance reference tables, at least one key assessment performance reference table defining a pulp fiber platform, including:
      a 'Basic' performance level specifying 'Basic' performance assessment criteria;
      an 'Intermediate' performance level specifying 'Intermediate' performance assessment criteria;
      an 'Advanced' performance level specifying 'Advanced' performance assessment criteria;
   the processor establishing secondary fiber handling and processing criteria,
      wherein the 'Basic' performance assessment criteria includes a first criteria where collection is randomly done by dealers and brokers;
      wherein the 'Intermediate' performance assessment criteria includes a first criteria where collection process is partially structured, material is shorted by supplier based on it usage at mill;
      wherein the 'Advanced' performance assessment criteria includes a first criteria where collection process is structured and waste fiber is shorted at the point of sourced and then collected; and
   the interface configured to receive an input specifying a pulp and paper industry area and a pulp and paper industry key assessment area with the pulp and paper industry area for analysis;
   wherein the processor searches the multidimensional pulp and paper industry performance reference set for a matching key assessment performance reference table that matches the pulp and paper industry area and the pulp and paper industry key assessment area, and retrieves the matching key assessment performance reference table; and
   wherein the processor performs analysis of the matching key assessment performance reference table; and obtains a resultant performance level for the pulp and paper industry key assessment area.

15. A system for high-performance capability assessment of a pulp and paper business, comprising:
   a processor operatively coupled to a communication network;
   an interface coupled to the processor configured to receive input;
   one or more databases operatively coupled to the processor and accessible through the communication network;
   a machine-readable memory operatively located in said one or more databases, said memory including a multi-dimensional pulp and paper industry performance reference set comprising multiple key assessment performance reference tables, at least one key assessment performance reference table defining a pulp fiber platform, including:
      a 'Basic' performance level specifying 'Basic' performance assessment criteria;
      an 'Intermediate' performance level specifying 'Intermediate' performance assessment criteria;
      an 'Advanced' performance level specifying 'Advanced' performance assessment criteria;
   the processor establishing pulping process criteria,
      wherein the 'Basic' performance assessment criteria includes a first criteria where Sulfite process and Kraft pulping process in batch mode having total manual operation exists; and
      wherein the 'Intermediate' performance assessment criteria includes a first criteria where Kraft pulping process having partially automated digester operation exists; and
      wherein the 'Advanced' performance assessment criteria includes a first criteria where Kraft pulping process using RDH/super batch process with automated Digester operation control exists; and
   the interface configured to receive an input specifying a pulp and paper industry area and a pulp and paper industry key assessment area with the pulp and paper industry area for analysis;
   wherein the processor searches the multidimensional pulp and paper industry performance reference set for a matching key assessment performance reference table that matches the pulp and paper industry area and the pulp and paper industry key assessment area, and retrieves the matching key assessment performance reference table; and
   wherein the processor performs analysis of the matching key assessment performance reference table; and obtains a resultant performance level for the pulp and paper industry key assessment area.

* * * * *

UNITED STATES PATENT AND TRADEMARK OFFICE
CERTIFICATE OF CORRECTION

PATENT NO. : 8,442,857 B1
APPLICATION NO. : 12/713597
DATED : May 14, 2013
INVENTOR(S) : Senthil Ramani et al.

Page 1 of 1

It is certified that error appears in the above-identified patent and that said Letters Patent is hereby corrected as shown below:

In the Specification

In column 6, line 42, replace "capability capability 920," with --capability 920,--.

Signed and Sealed this
Twenty-sixth Day of November, 2013

Margaret A. Focarino
*Commissioner for Patents of the United States Patent and Trademark Office*